United States Patent
Angal et al.

(10) Patent No.: US 9,487,851 B2
(45) Date of Patent: Nov. 8, 2016

(54) PRE-WELD HEAT TREATMENT FOR A NICKEL BASED SUPERALLOY

(71) Applicants: Ravishankar P. Angal, Orlando, FL (US); Allister William James, Chuluota, FL (US)

(72) Inventors: Ravishankar P. Angal, Orlando, FL (US); Allister William James, Chuluota, FL (US)

(73) Assignee: SIEMENS AKTIENGESELLSCHAFT, München (DE)

(*) Notice: Subject to any disclaimer, the term of this patent is extended or adjusted under 35 U.S.C. 154(b) by 429 days.

(21) Appl. No.: 14/062,066

(22) Filed: Oct. 24, 2013

(65) Prior Publication Data
US 2014/0238559 A1    Aug. 28, 2014

Related U.S. Application Data

(60) Provisional application No. 61/767,830, filed on Feb. 22, 2013.

(51) Int. Cl.
| | |
|---|---|
| *C22F 1/10* | (2006.01) |
| *C21D 1/84* | (2006.01) |
| *C22C 19/05* | (2006.01) |
| *C21D 9/50* | (2006.01) |

(52) U.S. Cl.
CPC . *C22F 1/10* (2013.01); *C21D 1/84* (2013.01); *C22C 19/055* (2013.01); *C21D 9/50* (2013.01); *C21D 9/505* (2013.01)

(58) Field of Classification Search
CPC ........ C21D 9/50; C21D 9/505; B23K 26/70; B23K 9/235; B23K 1/0018; B23K 1/20
See application file for complete search history.

(56) References Cited

U.S. PATENT DOCUMENTS

| | | |
|---|---|---|
| 3,741,824 A | 6/1973 | Duvall et al. |
| 3,753,790 A * | 8/1973 | Walker et al. ............... 148/675 |
| 3,871,928 A | 3/1975 | Smith, Jr. et al. |
| 4,336,312 A | 6/1982 | Clark et al. |
| 5,100,484 A | 3/1992 | Wukusick et al. |
| 5,328,659 A | 7/1994 | Tillman et al. |
| 5,509,980 A | 4/1996 | Lim |
| 6,120,624 A | 9/2000 | Vogt et al. |
| 6,696,176 B2 | 2/2004 | Allen et al. |
| 7,653,995 B2 | 2/2010 | Morin |
| 2006/0042729 A1 | 3/2006 | Kottilingam et al. |
| 2008/0210347 A1 | 9/2008 | Morin et al. |
| 2009/0121896 A1 | 5/2009 | Mitchell et al. |

FOREIGN PATENT DOCUMENTS

EP    1867835 A1    12/2007

* cited by examiner

*Primary Examiner* — Rebecca Lee (57) ABSTRACT

A pre-weld heat treatment of the nickel based superalloy including heating a nickel based superalloy (e.g., IN939) casting to 2120° F. at a rate of 2° F. per minute, and then soaking the casing for one hour at 2120° F. The casting is then cooled in stages including slowly cooling the casting at a rate of 1° F. per minute to about 1900° F. and holding at that temperature for about 10 minutes. Then the casting is further slowly cooled at a rate of 1° F. per minute to about 1800° F. and holding at that temperature for about 10 minutes, and further slowly cooled to a temperature range of 1650° F. to 1450° F., and then fast cooled to room temperature. The pre-weld heat treatment may optionally include a step of heating the casting to about 1850° F. at a rate of 50° F. per minute before slowly heating to 2120° F.

13 Claims, 10 Drawing Sheets

PRE-WELD HEAT TREATMENT FOR A NICKEL BASED SUPERALLOY

This application claims benefit of the 22 Feb. 2013 filing date of U.S. provisional patent application No. 61/767,830 which is incorporated by reference herein.

FIELD OF THE INVENTION

This invention relates generally to methods or techniques for the pre-weld heat treatment of nickel based superalloy castings. More specifically, the invention pertains to such pre-weld heat treatments of combustion turbine components composed of a nickel based superalloy.

BACKGROUND OF THE INVENTION

A number of superalloys are gamma prime strengthened nickel based superalloys and are used extensively for high temperature turbine components such as vanes and ring segments. One such superalloy is Inconel 939 (IN939), which is known to have a composition, in weight %, of about 22.0-22.8% Cr, about 18.5-19.5% Co, about 3.6-3.8% Ti, about 1.8-2.0% Al, about 1.8-2.2% W, about 0.9-1.1% Nb, about 1.3-1.5% Ta, about 0.13-0.17% C, and the balance comprising essentially Ni. After a superalloy component casting is formed or developed, it may be subjected to several heat treatments, such as a solution anneal heat treatment, stabilizing heat treatment and aging heat treatment, to strengthen the alloy and component by precipitation of the gamma prime phase in the gamma phase matrix. Although the strengthening gamma prime phase imparts desirable high temperature mechanical properties such as good tensile strength and creep resistance, it also reduces the weldability.

New components such as turbine vanes and ring segments are produced using an investment casting process; but, it is frequently necessary to weld these components both during post-cast manufacturing operations and during repair. However, some nickel based super alloys, such as the IN939 alloy, are difficult to weld without causing cracking when in the standard solution and aged condition. That is, the welding process may place strains at weld locations, which may cause cracking during welding or during the above-referenced post casting heat treatments.

Accordingly, the superalloy castings are often subjected to pre-weld heat treatment processes in order to alleviate potential cracking that may occur during welding or during heat treatments necessary to cause precipitation of the gamma prime phase and strengthen the superalloy. Such pre-weld heat treatments result in "overaging" (growing) the gamma prime phase to produce a coarse gamma prime structure. While these treatments may reduce mechanical properties of the casting or component, the treatments also reduce the propensity of the alloy to exhibit strain age cracking during welding and post weld heat treatments. Although prior art pre-weld heat treatments may effectively achieve a desired ductility of the superalloy to avoid strain age cracking, these procedures can be extremely time consuming due to the ramped heating and cooling stages and holding stages. Thus, the pre-weld heat treatments generally increase the complexity and costs of the manufacturing process of turbine components.

BRIEF DESCRIPTION OF THE DRAWINGS

The invention is explained in the following description in view of the drawings that show.

DETAILED DESCRIPTION OF THE INVENTION

An optimized pre-weld heat treatment has been developed for a nickel based superalloy casting to both ensure (1) that the alloy is adequately homogenized; and, (2) that the desirable over-aged gamma prime structure is generated without the precipitation of undesirable phases. In an embodiment, the pre-weld heat treatment may be used in heat treating the Inconel 939 (IN 939) nickel based superalloy. The pre-weld heat treatment of the nickel based superalloy is conducted for over-aging the gamma prime phase of the superalloy to alleviate strain age cracking during welding and post weld heat treatments. That is, the present invention for a pre-weld heat treatment achieves sufficient ductility for welding by first dissolving the gamma prime phase, then precipitating the gamma prime as coarse particles through an over-aging heat treatment.

The pre-weld heat treatment includes a super solvus heat treatment cycle with slow thermal ramp rates below the gamma prime solvus temperature to reduce the likelihood of localized incipient melting and to provide homogenization of the superalloy microstructure. In addition, slow cooling and hold times promote gamma prime coarsening. The slow cooling may be terminated at temperatures as high as 1650° F. (±25° F.) while still achieving the desired overaged gamma prime structure.

In accordance with the present invention, the pre-weld heat treatment of the nickel based superalloy may comprise:

heating a nickel based superalloy (e.g. IN939) casting to 2120° F. (±25° F.) at a rate of about 2° F. per minute;

soaking the casting for about one hour at 2120° F. (±25° F.);

slowly cooling the casting at a rate of about 1° F. per minute to about 1900° F. (±25° F.) and holding at that temperature for about 10 minutes;

slowly cooling the casting at a rate of about 1° F. per minute to about 1800° F. (±25° F.) and holding at that temperature for about 10 minutes; and, cooling the casting at a rate of about 1° F. per minute to a temperature from about 1650° F. (±25° F.) to about 1450° F. (±25° F.).

After the above-described cooling stage or step of slowly cooling the casting to a temperature from about 1650° F. (±25° F.) to about 1450° F. (±25° F.), the casting may be rapidly cooled to room temperature preferably by subjecting the casting to an inert gas purge. In addition, the pre-weld heat treatment may optionally include a step of heating the casting to about 1850° F. (±25° F.) at a rate of 50° F. per minute before slowly heating to the 2120° F. (±25° F.).

diffusion of the gamma prime forming elements and encourage the growth of gamma prime particles nucleated previously. Conversely, more rapid cooling rates promote the formation of an increased number of finer gamma prime particles. The presence of coarse gamma prime particles imparts increased ductility to the treated alloy casting.

With respect to Table I below, five heat treatments, HT#1-HT#5, were performed in accordance with the present invention on a one cubic inch casting composed of IN939, and according to the different slow and rapid cooling steps described therein. As further set forth in Table I, a pre-weld heat treatment, HT#6, was performed according to a heat treatment disclosed in U.S. Pat. No. 6,120,624. More specifically, an IN939 casting was heated to a temperature of about 2120° F. (±25° F.) at a rate of about 50° F. per minute. The nickel based superalloy was then held at a temperature of 2120° F. for about four hours, which is a soak time sufficiently long to complete solution of the gamma prime phase. The nickel based superalloy was then slow cooled from 2120° F. to 1200° F. at a rate of about 1° F. per minute and then after 1200° F. rapid cooling was performed to cool the casting to room temperature, as set forth below in Table I.

TABLE I

Experimental Heating and Cooling Cycles

| Sample | Detail |
| --- | --- |
| HT#1 | Heated to 1850° F. at 50° F./min.; then heat to 2120° F. at 2° F.; and soak at 2120° F., 1 hour. Then slow cool to 1900° F., hold for 10 min; then slow cool to 1800° F., hold for 10 min.; then slow cool at 1° F./min to 1450° F. After 1450° F. fast cool or argon purge to ambient temperature |
| HT#2 | Heated to 1850° F. at 50° F./min.; then heat to 2120° F. at 2° F. per min.; and soak at 2120° F., 1 hour. Then slow cool to 1900° F., hold for 10 min; then slow cool to 1800° F., hold for 10 min.; then slow cool at 1° F./min to 1500° F. After 1500° F. fast cool or argon purge to ambient temperature |
| HT#3 | Heated to 1850° F. at 50° F./min.; then heat to 2120° F. at 2° F. per min; and soak at 2120° F., 1 hour. Then slow cool to 1900° F., hold for 10 min; then slow cool to 1800° F., hold for 10 min.; then slow cool at 1° F./min to 1550° F. After 1550° F. fast cool or argon purge to ambient temperature |
| HT#4 | Heated to 1850° F. at 50° F./min.; then heat to 2120° F. at 2° F.; and soak at 2120° F., 1 hour. Then slow cool to 1900° F., hold for 10 min; then slow cool to 1800° F., hold for 10 min.; then slow cool at 1° F./min to 1600° F. After 1600° F. fast cool or argon purge to ambient temperature |
| HT#5 | Heated to 1850° F. at 50° F./min.; then heat to 2120° F. at 2° F.; and soak at 2120° F., 1 hour. Then slow cool to 1900° F., hold for 10 min; then slow cool to 1800° F., hold for 10 min.; then slow cool at 1° F./min to 1650° F. After 1650° F. fast cool or argon purge to ambient temperature |
| HT#6 | Heat treatment according to U.S. Pat. No. U.S. Pat. No. 6,120,624 Heat to 2120° F. at rate of 50° F./min + Soak at 2120° F. for 4 hours + After soak slow cool at 1° F./min to 1200° F., After 1200° F. fast cool or argon purge to ambient temperature |

While the above described heat treatment lists desired temperatures at the different heating and cooling stages the invention is not so limited. For example, the nickel based superalloy casting may be first heated at a rate of about 1° F. per minute to a desired temperature that is in the range of approximately 20° F. below the solvus temperature of the gamma prime phase up to the incipient melting temperature. By slowly ramping the temperature to the desired temperature at a rate of about 2° F. per minute, the pre-weld heat treatment promotes homogenization of the alloy (i.e., reduces segregation), and allows the gamma prime phase to completely (or almost completely) dissolve. The inventors have found that the slow cooling steps performed at these rates and held at such temperatures at resident times promote the precipitation and growth of coarse gamma prime phase particles. The slow cooling rates and hold times allow the The stepped heating of the present invention is different than the heating approach disclosed in U.S. Pat. No. 6,120,624, in that the homogenization of the gamma prime phase occurs during the final period of heating as well as during the soak time at maximum temperature. This approach reduces the propensity for localized incipient melting. The overall duration of the stepped heating and soak cycle is less than the continuous heating and soak cycle.

The stepped cooling cycle has ten minute holds at temperatures of 1900° F. and 1800° F. combined with a slow cooling rate of 1° F. per minute. This approach allows for increased coarsening of the gamma prime phase. Gamma prime coarsening occurs primarily at high temperatures where diffusion mechanisms are active. At a temperature of 1800° F. there is predicted to be around 20 weight percent gamma prime. At least with respect to heat treatment HT#5, the hold times during the cooling cycle are above the sigma phase solvus temperature (approximately 1650° F.) to avoid the precipitation of sigma. The gamma prime phase continues to coarsen during the slow cool from 1800° F.

From a commercial perspective there is a desire to minimize the total heat treatment time. Consequently, determining the highest temperature at which the cooling rate can be increased is very important. Experimental studies have shown that the desired overaged gamma prime may be achieved even when the slow cooling from 1800° F. is concluded at a temperature of 1650° F. Photomicrographs showing the gamma prime structure resulting from the various heat treatment cycles according to the present invention are shown in the attached FIGS. 1A, 1B through 5A, 5B.

Figure 1A:
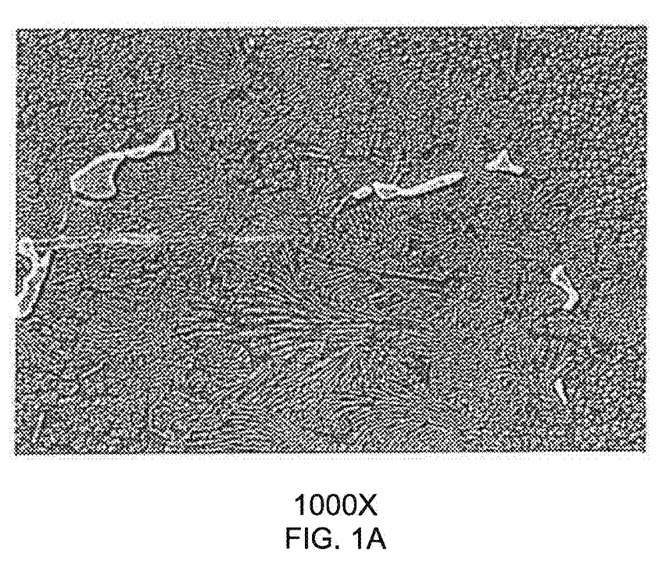
FIGS. 1A and 1B are photomicrographs at 1000× and 4000×, respectively, of the IN939 microstructure after the pre-weld heat treatment, HT#1, set forth in Table I, and in accordance with the present invention.
Figure 1B:
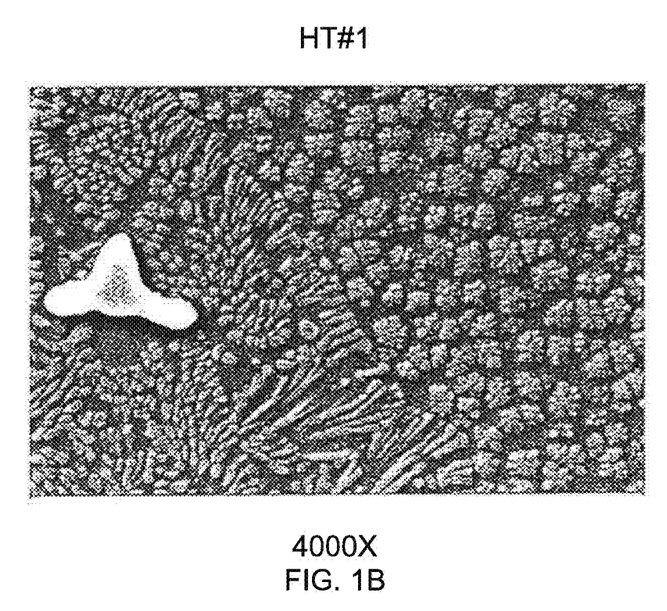
Figure 2A:
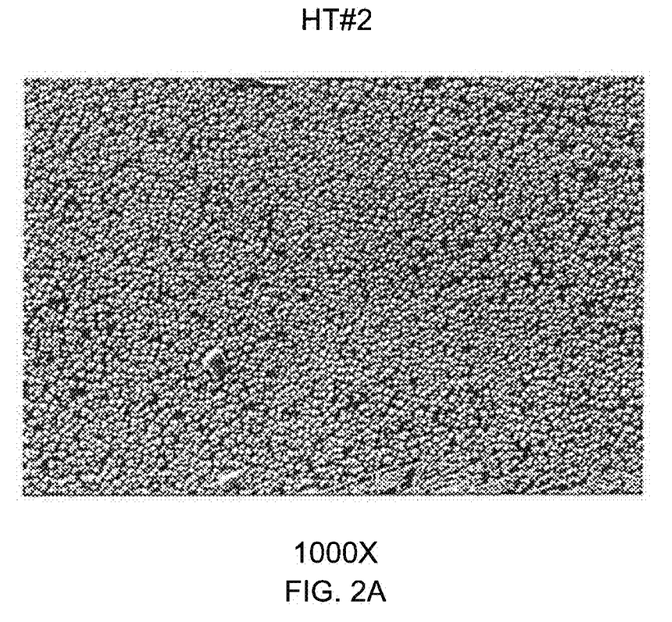
FIGS. 2A and 2B are photomicrographs at 1000× and 5000×, respectively, of the IN939 microstructure after the pre-weld heat treatment, HT#2, set forth in Table I, and in accordance with the present invention.
Figure 2B:
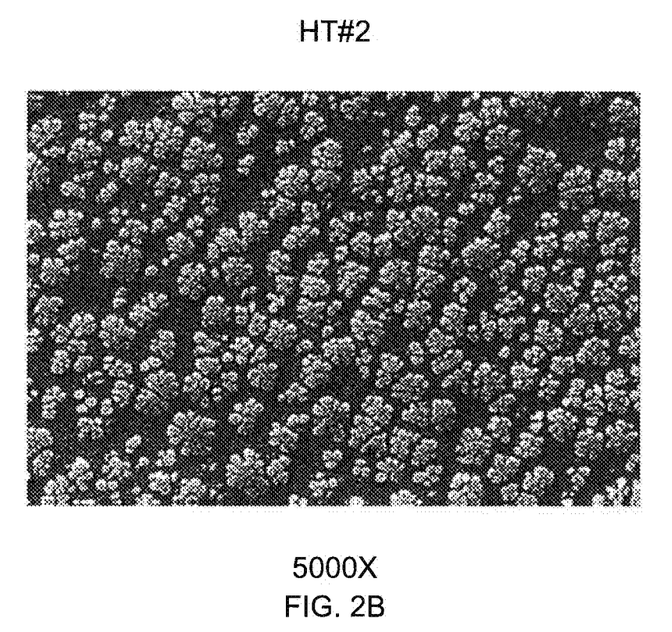
Figure 3A:
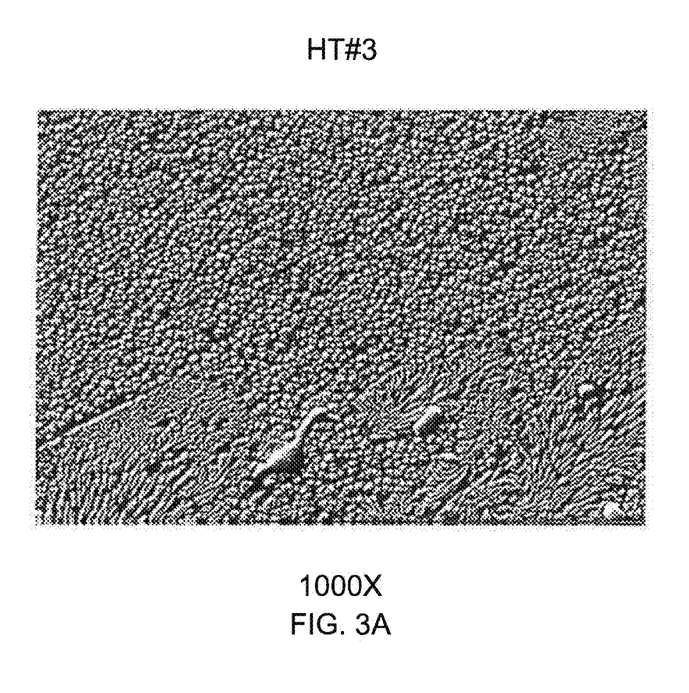
FIGS. 3A and 3B are photomicrographs at 1000× and 5000×, respectively, of the IN939 microstructure after the pre-weld heat treatment, HT#3, set forth in Table I, and in accordance with the present invention.
Figure 3B:
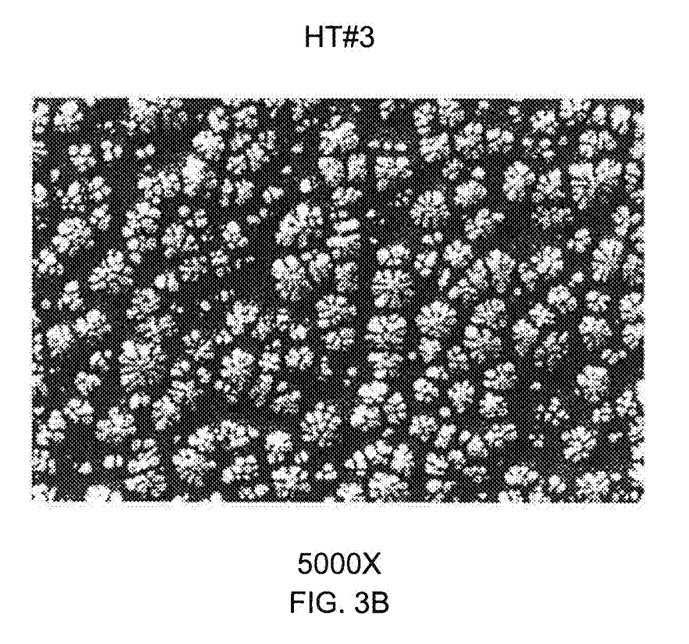
Figure 4A:
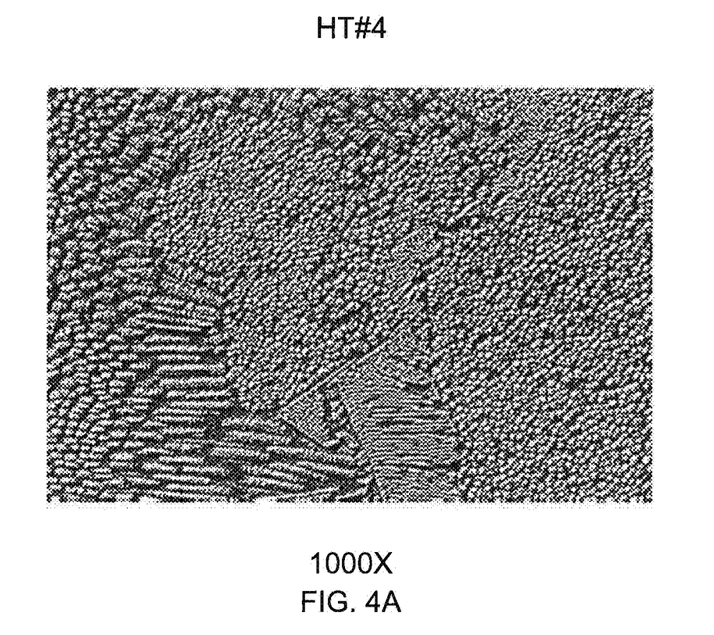
FIGS. 4A and 4B are photomicrographs at 1000× and 5000×, respectively, of the IN939 microstructure after the pre-weld heat treatment, HT#4, set forth in Table I, and in accordance with the present invention.
Figure 4B:
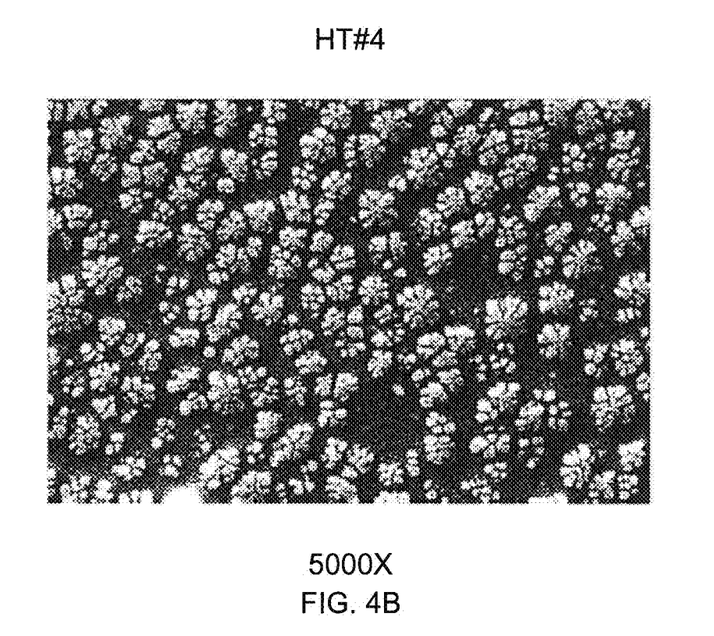
Figure 5A:
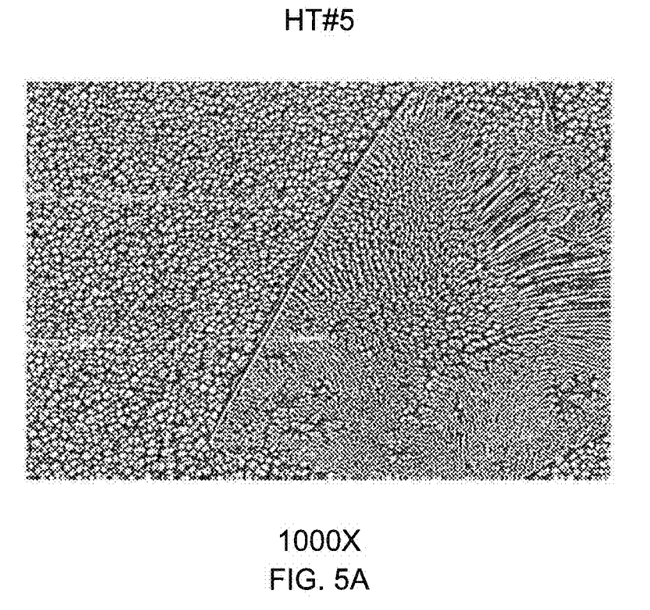
FIGS. 5A and 5B are photomicrographs at 1000× and 5000×, respectively, of the IN939 microstructure after the pre-weld heat treatment, HT#5, set forth in Table I, and in accordance with the present invention.
Figure 5B:
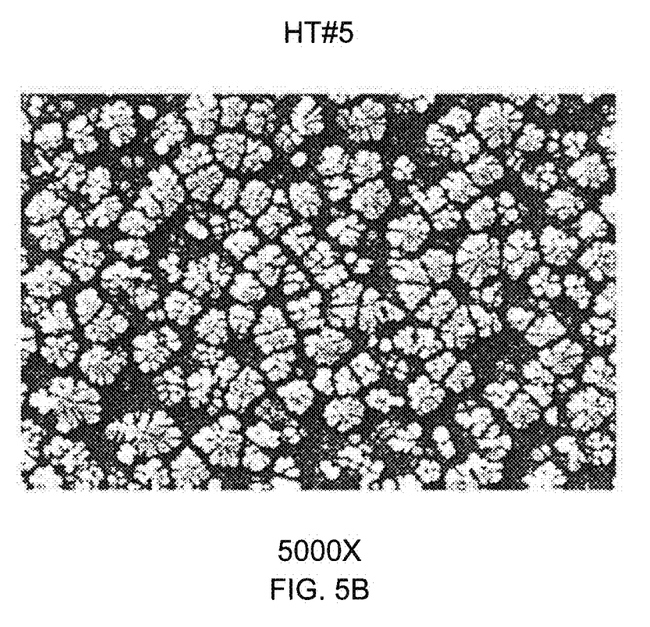
Figure 6A:
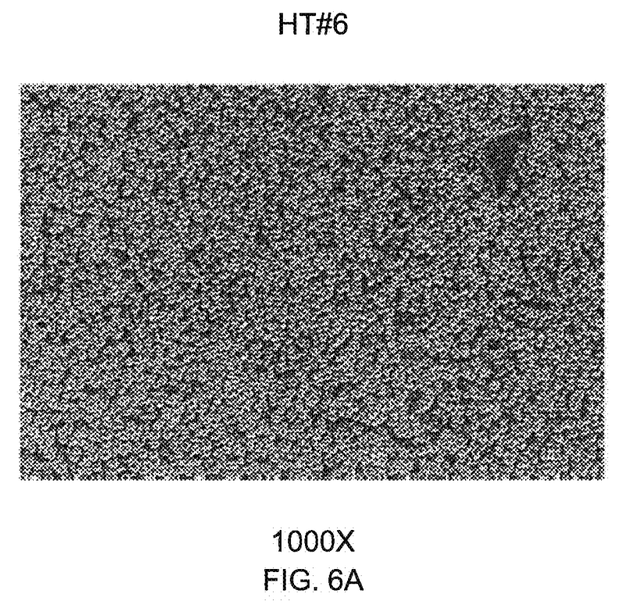
FIGS. 6A and 6B are photomicrographs at 1000× and 5000×, respectively, of the IN939 microstructure after a pre-weld heat treatment, HT#6, set forth in Table I, and as disclosed in U.S. Pat. No. 6,120,624.
Figure 6B:
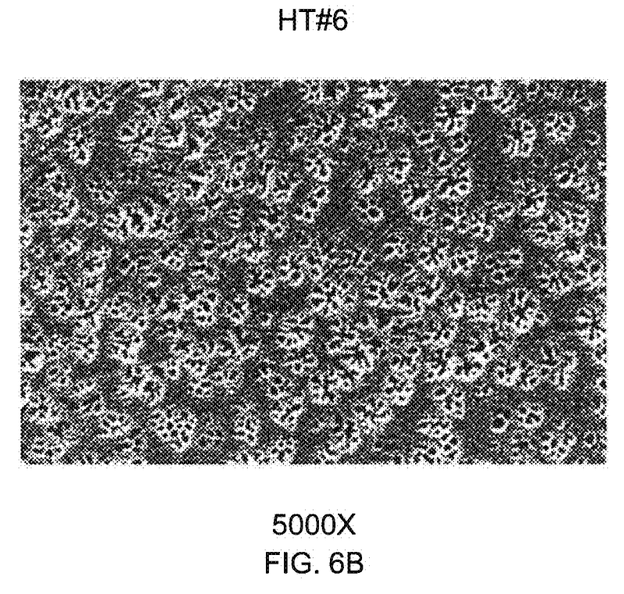

The photomicrograph of a gamma prime structure for the HT#6 sample is shown in FIGS. 6A and 6B. During this treatment cycle the sample casting was cooled at a rate of 1° F. per minute to about 1200° F. As shown in FIGS. 6A and 6B and based on visual comparisons of photomicrographs, the gamma prime particle sizes are smaller in comparison to those particle sizes of the gamma prime phase shown in FIGS. 1A to 5B, which were treated in accordance with the present invention.

Tensile testing was performed on the sample castings heat treatments HT#1-HT#5 at 800° C., and the results of such tests are set forth in the below Table II. These heat treatments, HT#1-HT#5 were performed in accordance with the present invention.

TABLE II

Tensile Testing at 800 C. and Hardness (HRC) at Room Temperature

| Heat Treat# | UTS | 0.2% Y.S | % E | % R.A. | Hardness HRC |
|---|---|---|---|---|---|
| 1 | 660 | 466 | 22 | 30.5 | 31 |
| 2 | 671 | 474 | 21 | 26.5 | 31.4 |
| 3 | 698 | 486 | 23 | 23 | 29.8 |
| 4 | 719 | 493 | 18 | 24.5 | 29.6 |
| 5 | 734 | 500 | 15 | 20 | 31.6 |
| 6** | 632 | 462 | 28 | 38 | 33.0 |

**Tensile testing was performed in the overage + diffusion coat heat treatment condition while hardness was taken in overage heat treatment condition.

Each of the above heat treatments, HT#1-HT#5 provides advantages over prior art pre-weld heat treatments that require a slow cooling rate 1-3° F./min, and preferably 1° F./min, to below 1450° F. (preferably below 1250° F.). More specifically, the pre-weld heat treatment according to the present invention may be more cost effective in terms of time savings and manufacturing costs because one may save as much as about 5 to 8 hours by allowing an increased cooling rate after reaching a temperature range of about 1650° F.-1450° F. as compared to the pre-weld heat treatment disclosed in U.S. Pat. No. 6,120,624.

Figure 8A:
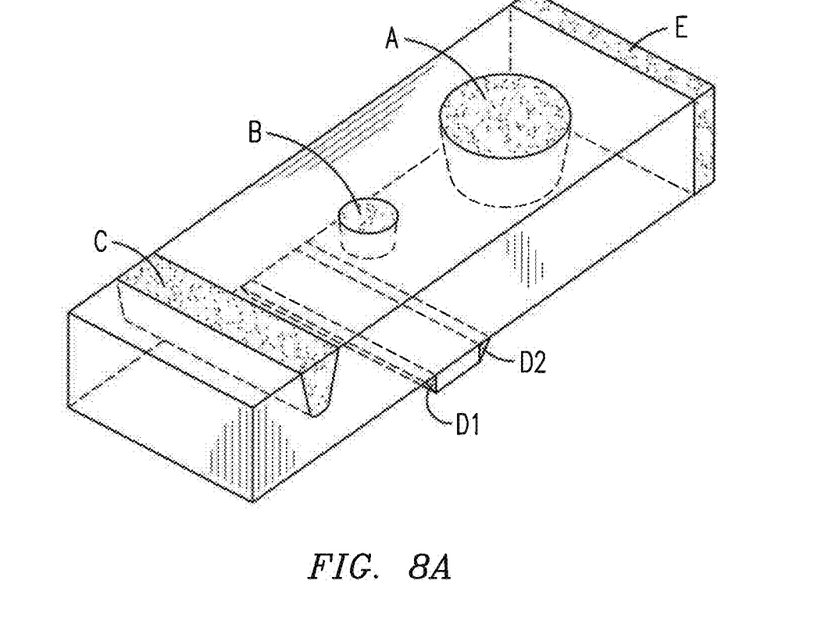
FIGS. 8A and 8B are schematic illustrations of a coupon weld including welds after a pre-weld heat treatment according to the present invention.
Figure 8B:
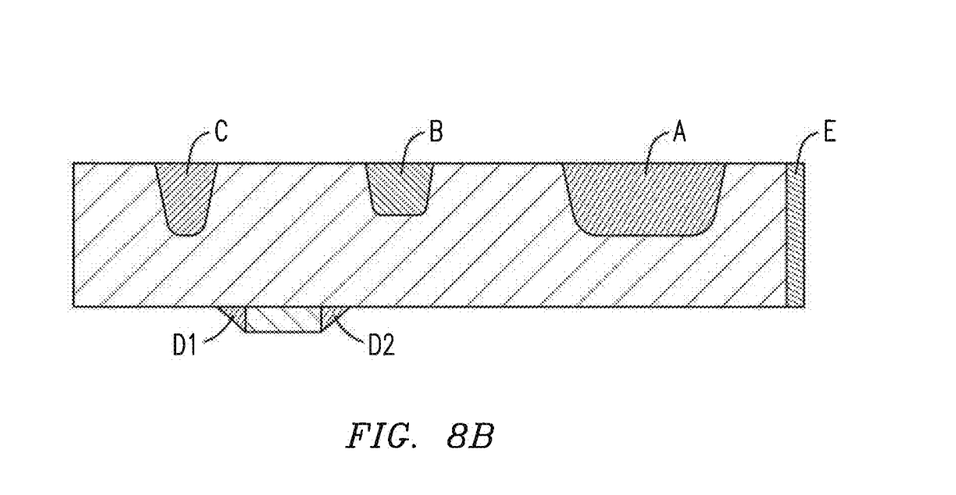

Additional testing was performed to evaluate the absence or presence of strain age cracking during welding of a sample casting and post weld heat treatments typically included in the manufacture of superalloy turbine components. An investment equiaxed cast slab of IN939 having dimensions of 8"×4"×½" was provided and cut into three smaller sections. These three sections were then machined to include a plurality of artificial defects of various shapes and sizes representing defects of a component casting that required welding. Each of these so machined sections will be referred to as "weld coupons." Welding scope on the weld coupons consisted of welding artificial defects of diameter 0.5" and 0.25", and depths of 6 mm and 5 mm (A, B, respectively, in FIGS. 8A and 8B), slot C (width 5 mm and depth 6 mm), fillet weld D1, D2 (length is the same as width of coupon) on the side of the coupon and weld buildup E (2.5 mm wide) as shown in FIGS. 8A and 8B.

Figure 7A:
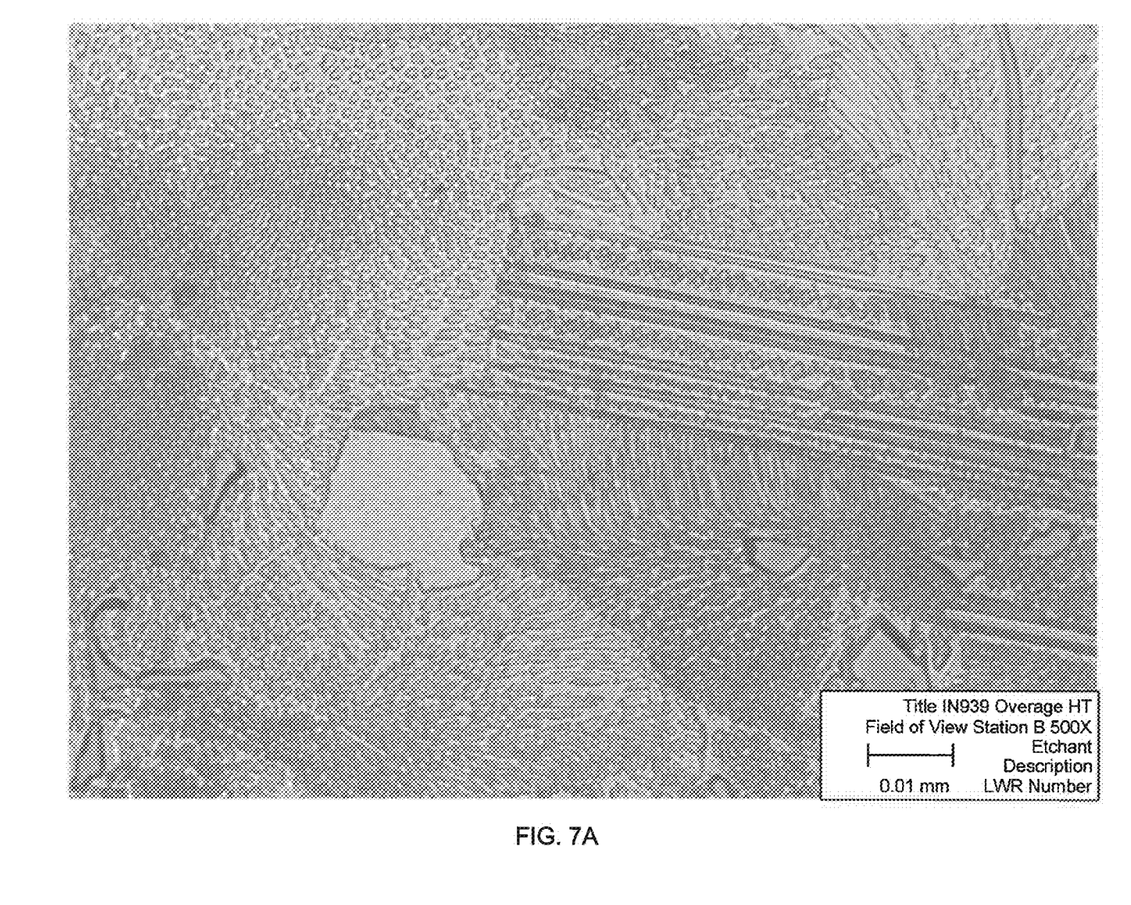
FIGS. 7A and 7B are photomicrographs of a sectional view of a sample weld coupon to demonstrate a gamma prime microstructure consistent with that obtained in a pre-weld heat treatment in accordance with the present invention.
Figure 7B:
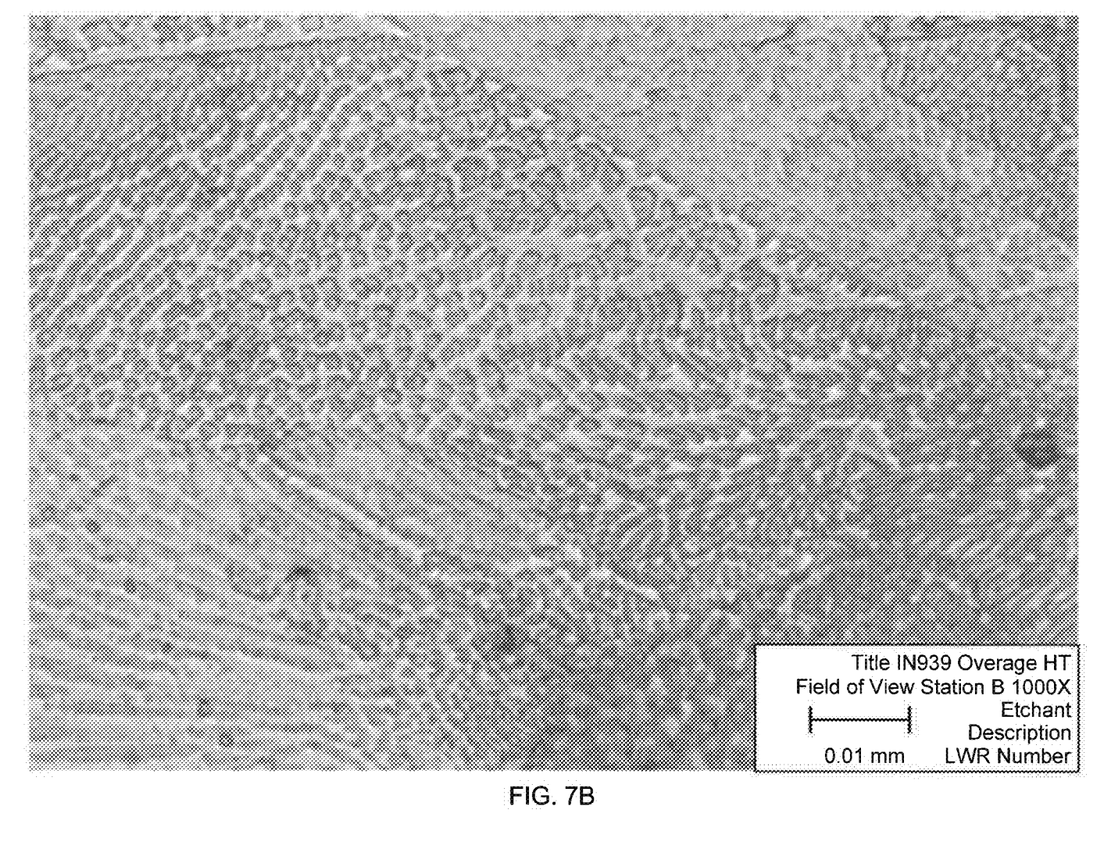

Each of the weld coupons was then subjected to a pre-weld heat treatment in accordance with the above-described heat treatment, HT#5. After completion of the heat treatment, including the cooling stages or steps, a sample end slice of each weld coupon was taken and inspected. It was determined that gamma prime particle growth of each of the weld coupons was consistent with that shown in sample casting that was subject to the pre-weld heat treatment, HT#5, as represented in FIGS. 5A and 5B. Microphotographs of weld coupon slices are shown in FIGS. 7A and 7B and indicating particle growth consistent with pre-weld heat treatment, HT#5.

Each of the weld coupons was then subjected to post casting procedures including welding and post weld heat treatments (solution anneal, stabilization and age heat treatments) to generally replicate manufacturing steps of a superalloy turbine component. With respect to each weld coupon, each of the plurality of indentations or man-made defects was welded using a Nimonic 263 weld filler wire. A different welder performed the welding on each respective weld coupon in order to represent a realistic manufacturing scenario.

After welding the coupons, the following post weld heat treatments were performed. A solution heat treatment was performed at 1160° C.±15° C. (2120° F.±25° F.) in vacuum for 4 hours (240+15/−0 minutes). Each weld coupon was then cooled rapidly (in 3 minutes or less) to 1000° C. (1832° F.); and, then gas (inert gas) cooled to room temperature. The weld coupons were fast cooled from 1000° C. to 540° C. in 20 minutes or less. After 540° C. they were cooled to room temperature.

A stabilization heat treatment was performed on each weld coupon at 1000° C.±15° C. (1832° F.±25° F.) in vacuum for 6 hours (360+15/−0 minutes) on each weld coupon. Each weld coupon was then gas (inert gas) cooled to room temperature. The cooling rate may be 1000° C. to 540° C. in 20 minutes or less. Air cooling is permitted from 540° C. to room temperature.

An age heat treatment was finally performed at 800° C.±15° C. (1472° F.±25° F.) in vacuum for 16 hours (960±15 minutes), with respect to each weld coupon, which were then gas (inert gas) cooled rapidly to room temperature. Air cooling is permitted from 540° C. to room temperature.

Figure 9A:
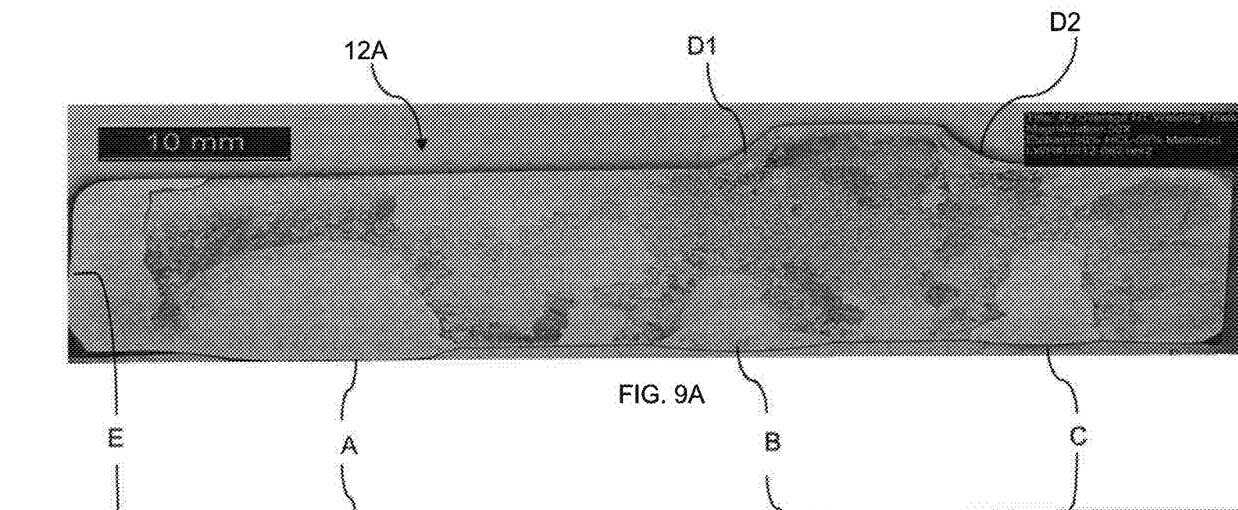
FIGS. 9A and 9B are photomicrographs of the cross section of a sample weld coupon having been subjected to a pre-weld heat treatment in accordance with the present invention, welding and post weld heat treatments such as solution anneal, stabilization and age consistent with the manufacture of a turbine component.
Figure 9B:
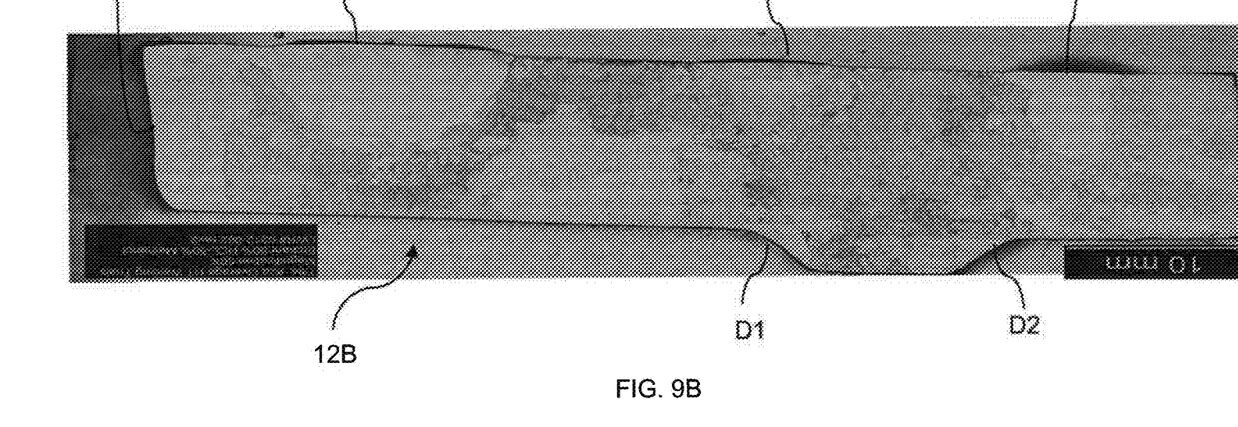

A visual inspection and fluorescent penetrant inspection (FPI) were performed on each weld coupon after the welding step and after each of the above-described post weld heat treatment. Based on these inspections, no linear indications related to cracking were detected. After the welding and all visual and FPI inspections were completed, each of the weld coupons was then cut longitudinally forming longitudinal cross-sections. Photomicrographs were taken of the cross-sections to inspect the weld coupons for strain age cracking the weld locations. No strain age cracking was observed in any of the three weld coupons. One of the weld coupons displayed no welding defects, while two of the weld coupon showed signs of welding defects such as undercuts not related to strain age cracking. With respect to FIGS. 9A and 9B, microphotographs of the cross-sections 12A and 12B of a sample welding coupon, which was treated according to the pre-weld heat treatment of the present invention, showed no signs of strain age cracking or welding defects at the welds sites A, B, C, D1, D2 and E. In view of the foregoing, a pre-weld heat treatment has been tested and demonstrated that achieves a desired ductility in an IN939 superalloy casting that eliminates strain age cracking that may occur during welding and post casting heat treatments.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A pre-weld heat treatment of a nickel based superalloy casting for overaging a gamma prime phase to alleviate strain age cracking during welding and post weld heat treatments, comprising:
   heating the casting to a first temperature within the range between 35° F. below a gamma prime solvus temperature and an incipient melting temperature of the alloy;
   soaking the casting for about one hour at the first temperature;
   cooling the casting at a rate of about 1° F. per minute to a first holding temperature of 1900° F.±25° F., and holding at the first holding temperature for about ten minutes;
   cooling the casting at a rate of about 1° F. per minute to a second holding temperature of 1800° F.±25° F., and holding at the second holding temperature for about ten minutes; and,
   cooling the casting at a rate of about 1° F. per minute to a temperature ranging from 1650° F.±25° F. to 1450° F.±25° F.

2. The pre-weld heat treatment of claim 1, further comprising after cooling the casting to a temperature ranging from 1650° F.±25° F. to about 1450° F. ±25° F., then cooling the casting to room temperature.

3. The pre-weld heat treatment of claim 1, wherein the step of heating the casting includes heating the nickel based superalloy to 2120° F.±25° F.

4. The pre-weld heat treatment of claim 2, further comprising heating the nickel based superalloy casting to 1850° F.±25° F., at a rate of about 50° F. per minute, before heating to 2120° F.±25° F.

5. The pre-weld treatment of claim 1, wherein the nickel based super alloy has a composition consisting essentially of, in weight %, about 22.0-22.8% Cr, about 18.5-19.5% Co, about 3.6-3.8% Ti, about 1.8-2.0% Al, about 1.8-2.2% W, about 0.9-1.1% Nb, about 1.3-1.5% Ta, about 0.13-0.17% C, and the balance comprising essentially Ni.

6. A pre-weld heat treatment of a nickel based superalloy casting for overaging a gamma prime phase to alleviate strain age cracking during welding and post weld heat treatments, comprising:
   heating a nickel based superalloy casting to 1850° F.±25° F. at a rate of 50° F. per minute before slowly heating to 2120° F.±25° F.;
   heating the casting to 2120° F.±25° F. at a rate of about 2° F. per minute;
   soaking the casting for not more than about one hour at 2120° F.±25° F.;
   cooling the casting at a rate of about 1° F. per minute to a first holding temperature of 1900° F.±25° F., and holding at the first holding temperature for about ten minutes;
   cooling the casting at a rate of about 1° F. per minute to a second holding temperature of 1800° F.±25° F., and holding at the second holding temperature for about ten minutes; and,
   cooling the casting at a rate of about 1° F. per minute to a temperature from 1650° F.±25° F. to 1450° F.±25° F.

7. The pre-weld heat treatment of claim 6, further comprising cooling the casting to room temperature.

8. A pre-weld heat treatment of a nickel based superalloy casting consisting essentially of, in weight %, about 22.0-22.8% Cr, about 18.5-19.5% Co, about 3.6-3.8% Ti, about 1.8-2.0% Al, about 1.8-2.2% W, about 0.9-1.1% Nb, about 1.3-1.5% Ta, about 0.13-0.17 C, and the balance comprising essentially Ni, for overaging a gamma prime phase to alleviate strain age cracking during welding and post weld heat treatments, comprising:
   heating the casting to a first temperature within the range between 35° F. below a gamma prime solvus temperature and an incipient melting temperature of the alloy;
   soaking the casting for about one hour at the first temperature;
   cooling the casting at a rate of about 1° F. per minute to a first holding temperature of 1900° F.±25° F., and holding at the first holding temperature for about ten minutes;
   cooling the casting at a rate of about 1° F. per minute to a second holding temperature of 1800° F.±25° F., and holding at the second holding temperature for about ten minutes; and,
   cooling the casting at a rate of about 1° F. per minute to a temperature from 1650° F.±25° F. to 1450° F.±25° F.

9. The pre-weld heat treatment of claim 8, further comprising after cooling the casting to a temperature ranging from 1650° F.±25° F. or to about 1450° F. ±25° F., then cooling the casting to room temperature.

10. The pre-weld heat treatment of claim 8, wherein the step of heating the casting includes heating the nickel based superalloy to 2120° F.±25° F.

11. The pre-weld heat treatment of claim 10, further comprising heating the nickel based superalloy casting to 1850° F.±25° F., at a rate of about 50° F. per minute, before heating to 2120° F.±25° F.

12. The pre-weld heat treatment of claim 1, further comprising heating the nickel based superalloy casting to about 1850° F.±25° F., at a rate of about 50° F. per minute before heating to about 2120° F. (±25° F.).

13. The pre-weld heat treatment of claim 11, further comprising heating the nickel based superalloy casting from 1850° F.±25° F. to the first temperature at a rate of about 2° F. per minute.

* * * * *